United States Patent [19]

Mahant-Shetti et al.

[11] Patent Number: 5,654,981
[45] Date of Patent: Aug. 5, 1997

[54] SIGNAL TRANSMISSION SYSTEM AND METHOD OF OPERATION

[75] Inventors: Shivaling S. Mahant-Shetti, Richardson; Robert J. Landers, Plano, both of Tex.

[73] Assignee: Texas Instruments Incorporated, Dallas, Tex.

[21] Appl. No.: 718,118

[22] Filed: Sep. 18, 1996

Related U.S. Application Data

[60] Continuation of Ser. No. 479,314, Jun. 7, 1995, abandoned, which is a division of Ser. No. 250,984, May 31, 1994, Pat. No. 5,535,241.

[51] Int. Cl.⁶ .................................. H04B 1/38; H04L 5/16
[52] U.S. Cl. .......................... 375/219; 375/257; 326/83; 326/87; 326/90; 327/103; 327/108
[58] Field of Search .................................. 375/219, 257, 375/259; 326/82, 83, 30, 87, 90; 327/103, 108; 340/537

[56] References Cited

U.S. PATENT DOCUMENTS

| | | | |
|---|---|---|---|
| 4,498,021 | 2/1985 | Uya | 375/257 |
| 4,713,827 | 12/1987 | Lauffer et al. | 357/257 |
| 4,896,333 | 1/1990 | Can | 375/219 |
| 5,144,162 | 9/1992 | Tran | 326/87 |
| 5,184,035 | 2/1993 | Sugibayashi | 326/86 |

Primary Examiner—Stephen Chin
Assistant Examiner—Don Vo
Attorney, Agent, or Firm—William B. Kempler; Richard L. Donaldson

[57] ABSTRACT

A signal transmission system (10) is provided that comprises a transmitter circuit (12) which transmits a signal through a transmission line (16) to a receiver circuit (14) using the current mode of signal transmission. A steady state current is supplied by a steady state current source (22). An active state current is provided by an active current source (20). A boost circuit (18) is provided to reduce delay associated with the transmission line (16) by increasing charge to the transmission line and providing additional discharge path from the transmission line during transitions of the signal propagating along transmission line (16).

5 Claims, 1 Drawing Sheet

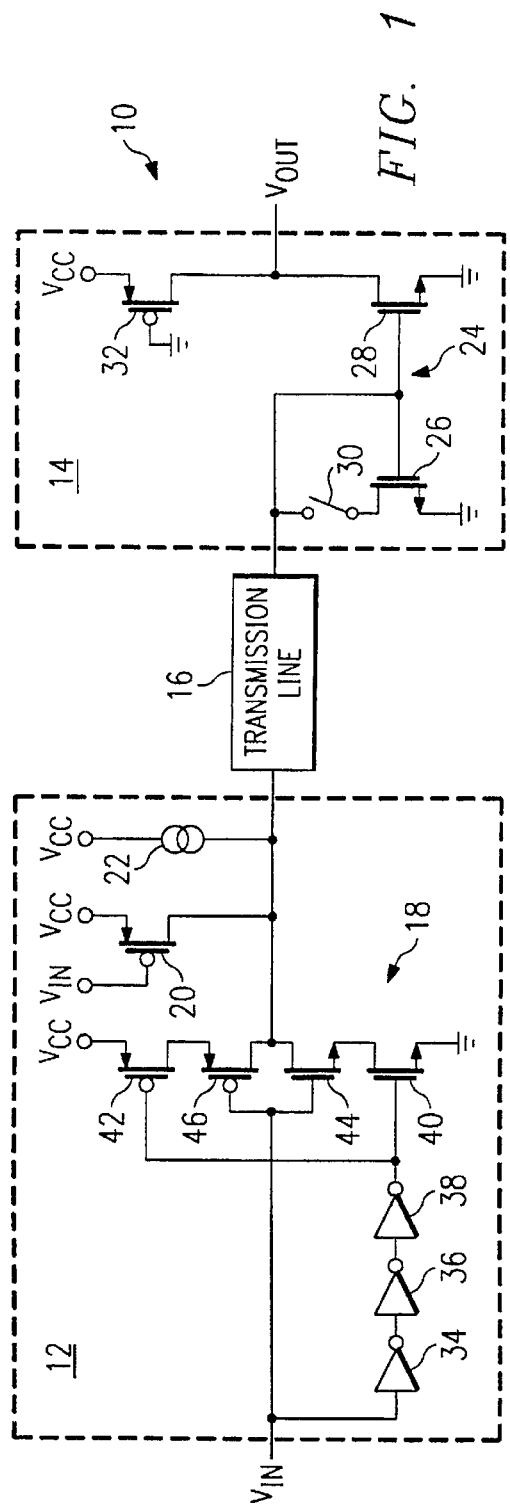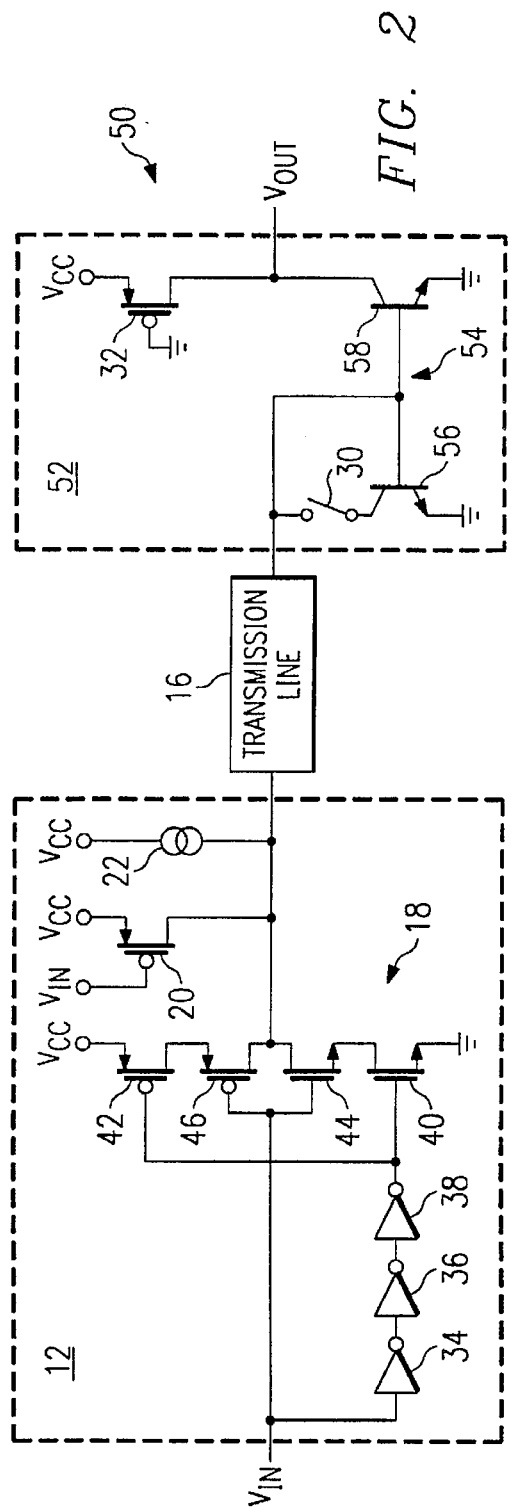

5,654,981

SIGNAL TRANSMISSION SYSTEM AND METHOD OF OPERATION

This application is a continuation of application Ser. No. 08/479,314, filed Jun. 7, 1995 now abandoned. Which is a division of application Ser. No. 08/250,984 filed May 31, 1994. Now U.S. Pat. No. 5,535,241.

TECHNICAL FIELD OF THE INVENTION

This invention relates in general to the field of electronic systems and more particularly to an improved signal transmission system and method of operation.

BACKGROUND OF THE INVENTION

Integrated circuit systems often require the transmission and receipt of signals over relatively large distances. For example, in large scale gate arrays, the interconnection of various base gate cells can sometimes require signals to propagate over the entire width of an integrated circuit chip. In today's technology, integrated circuit chips have grown so large that some signals may need to propagate many millimeters. The length of the lines associated with these signals creates long transmission lines which result in large delays.

Ordinarily, when a signal needs to be propagated over a large distance or a large fan-out is required for a signal, large bipolar devices are used to generate enough current and charge to overcome the problems with fan-out and delay associated with long line length. Large hi-polar signal drivers are available in BICMOS and BINMOS integrated circuit configurations. However, the addition of bipolar systems to an integrated circuit system greatly increases the cost of the production of the system. Further, no matter what the size of the device driver, transmission of voltage mode signals are susceptible to local fluctuations in the ground plane which can cause errors in the transmission of the signals.

SUMMARY OF THE INVENTION

Accordingly, a need has arisen for a signal transmission system and method which substantially eliminates problems and disadvantages associated with prior solutions. In accordance with the teachings of the present invention, the signal transmission system and method of operation are presented that allow for the transmission of signals over large distances carrying large line capacitances that are not susceptible to the errors associated with prior systems and methods of operation.

According to one embodiment of the present invention, a signal transmission system is provided that comprises a signal transmitter circuit operable to receive an input signal and generate a steady state current and an active current responsive to the value of the input signal. The transmitter circuit is coupled to a transmission line which is coupled to a receiver circuit. The receiver circuit comprises a current mirror and a current source coupled in such a manner as to sense the current received from the transmission circuit and to create an output voltage having a value dependent upon whether or not the transmission circuit transmitted the steady state current or the active current.

According to a further embodiment of the present invention, a line booster and line discharge circuit is also provided in the transmission circuit. The line booster and line discharge circuit is coupled to the input signal and to the transmission line and is operable to provide a boost of current into the transmission line for a predetermined period of time when the line is transitioning from a low to a high logic level. The booster and discharge circuit is further operable to discharge charge from the transmission line for a predetermined period of time when the signal on the transmission line is transitioning from a high to a low logic level.

BRIEF DESCRIPTION OF THE DRAWINGS

A more complete understanding of the teachings of the present invention may be acquired by referring to the accompanying drawings in which like reference numbers indicate like features and wherein:

FIG. 1 is a schematic illustration of a CMOS-based signal transmission system constructed according to the teachings of the present invention; and FIG. 2 is a schematic illustration of a BICMOS-based signal transmission system constructed according to the teachings of the present invention.

DETAILED DESCRIPTION OF THE INVENTION

Referring to FIG. 1, a signal transmission system indicated generally at 10 is shown to comprise a signal transmitter circuit 12 which transmits a signal to a receiver circuit 14 through a transmission line 16. Signal transmission circuit 12 receives an input signal $V_{IN}$ at the inputs of a booster circuit indicated generally at 18 and at the gate of an active current source 20. A steady state current source 22 also provides a steady state current $I_{LOW}$ to transmission line 16. Active current source 20 may comprise a p-channel field effect transistor (P-FET) having its gate coupled to the input signal $V_{IN}$, its source coupled to a $V_{CC}$ supply voltage, and its drain coupled to the transmission line 16.

The system of the present invention utilizes the current mode of signal transmission. An active signal corresponds to a low voltage level of the input voltage signal $V_{IN}$. Such a voltage level of the signal $V_{IN}$ activates the P-FET 20 causing additional current to be transmitted to transmission line 16. P-FET 20 is sized such that it provides a differential current $I_{DELTA}$. Steady state current source 22 provides the steady state current $I_{LOW}$. Accordingly, an active signal through transmission line 16 when an active current $I_{HIGH}$ is transmitted to receiver circuit 14 where $I_{HIGH}=I_{LOW}+I_{DELTA}$. In comparison, an inactive signal corresponding to a high voltage level of the $V_{IN}$ input signal corresponds to only the $I_{LOW}$ current being transmitted through transmission line 16 to receiver circuit 14.

The system of the present invention functions to transmit the $V_{IN}$ input signal through the transmission line 16 using the current mode. In other words, the digital character of the $V_{IN}$ input signal is presented through the transmission line 16 as either the $I_{LOW}$ steady state current or the $I_{HIGH}$ active current by controlling the current supply to the transmission line 16 by active current source 20. At the opposite end of transmission line 16, the current is received by the receiver circuit 14. The receiver circuit 14 comprises a current mirror indicated generally at 24 which comprises an n-channel field effect transistor (N-FET) 26 and an N-FET 28. The signal received from the transmission line 16 is coupled to the gates of N-FET 26 and N-FET 28. The signal received from transmission line 16 is also selectively coupled to the drain of N-FET 26. The sources of N-FET 26 and N-FET 28 are coupled to ground potential.

A switch 30 selectively disconnects the drain of N-FET 26 from the transmission line 16 to prevent the steady state current supplied by current source 22 from flowing during inactive periods of operation. The current mode of transmission provides a large number of advantages that will be detailed herein. However, if the switch 30 is not disabled during long terms of inactivity, DC current will be lost to ground.

The drain of N-FET 28 is coupled to the drain of a P-FET 32. The gate of P-FET 32 is coupled to ground potential. The source of P-FET 32 is coupled to the $V_{CC}$ supply voltage. An output signal You$_T$ is taken from the drains of P-FET 32 and N-FET 28. The current received from transmission line 16 is mirrored in current mirror 24. The current in N-FET 28 will cause the output voltage $V_{OUT}$ to vary from almost $V_{CC}$ to ground potential depending upon the amount of current received from transmission line 16.

An important technical advantage of the present invention inheres in the fact that the transmission of the present invention uses the current mode of signalling. As such, there is no comparison of the voltage to a universal ground potential. As such, the system of the present invention does not suffer the disadvantages associated with errors resulting from fluctuations in local ground potential common with voltage mode signalling. The ground potential coupled to the receiver circuit 14 and the ground potential coupled to the transmitter circuit 12 can vary with respect to one another without affecting the operation of the system of the present invention because the current mode is used for transmission through transmission line 16.

In general, boost circuit 18 decreases the delay associated with the capacitance inherent within transmission line 16 by providing an extra amount of charge when transmission line 16 is to be charged and providing an extra path for discharging of transmission line 16 when transmission line 16 is to be discharged. The boost circuit 18 does not function during steady state transmission but only operates during transitions of the input signal $V_{IN}$. Referring to FIG. 1, boost circuit 18 comprises three inverters 34, 36, and 38 coupled in series between the input voltage $V_{IN}$ and the gates of an N-FET 40 and a P-FET 42. The source of N-FET 40 is coupled to ground potential. The source of P-FET 42 is coupled to the $V_{CC}$ supply voltage. The $V_{IN}$ signal is also coupled directly to the gates of an N-FET 44 and a P-FET 46. The source of P-FET 46 is coupled to the drain of P-FET 42. The drain of P-FET 46 is coupled to the transmission line 16. The source of N-FET 44 is coupled to the drain of N-FET 40. The drain of N-FET 44 is also coupled to the transmission line 16.

The boost circuit 18 operates when the input signal $V_{IN}$ transitions to a high voltage level. At this time, N-FET 44 functions to pull the transmission line 16 quickly to ground potential for the time period that it takes the $V_{IN}$ signal to propagate through inverters 34, 36, and 38. After the high voltage level has propagated through inverters 34, 36, and 38, the transmission line 16 returns to a voltage on the order of 0.7 volts. Accordingly, for a brief period of time, the boost circuit 18 provides an additional path for charge to discharge from transmission line 16 when the input voltage signal $V_{IN}$ goes high. As discussed previously, the input voltage $V_{IN}$ is inverted prior to being transmitted through transmission line 16.

Similarly, when the input voltage signal $V_{IN}$ changes to a low voltage state, the P-FET 46 provides an instantaneous boost of current to help charge the capacitance inherent within transmission line 16. This boost of current lasts for the period of time it requires the low voltage level to propagate through inverters 34, 36, and 38.

The amount of charge discharged from transmission line 16 and the amount of charge injected into transmission line by boost circuit 18 is dependent upon the length of the delay caused by inverters 34, 36, and 38. As such, the system 10 of the present invention is tunable in the sense that for transmission lines which require a higher boost level, the delay can be increased by increasing the delay through the inverters 34, 36, and 38. This can be implemented by adding inverters in series with inverters 34, 36, and 38, or altering the construction of inverters 34, 36, and 38 to increase the delay. Similarly, if less boost is required, the delay can be reduced by inserting only a single inverter or changing the construction of inverters 34, 36, and 38 to reduce the propagation time through the series connection of these inverters.

FIG. 2 is a schematic illustration of a BICMOS implementation of a transmission system 50 constructed according to the teachings of the present invention. Transmission system 50 uses the identical transmission circuit 12 discussed with reference to FIG. 1 previously. Transmission system 50 uses a receiver circuit 52 which utilizes a bipolar current mirror 54 in place of current mirror 24 discussed previously. Bipolar current mirror 54 comprises an NPN transistor 56 having its collector coupled to switch 30 described previously. Further, transistor 56 has its emitter coupled to ground potential and its base coupled to the transmission line 16. Current mirror 54 further comprises an NPN bipolar transistor 58 having its base coupled to the transmission line 16. The emitter of transistor 58 is coupled to ground potential and the collector of transistor 58 is coupled to the drain of transistor 32 described previously. The output voltage is taken from the collector of transistor 58 and the drain of transistor 32.

As discussed previously, the incorporation of bipolar devices within an integrated system such as system 50 increases the costs of system 50 as compared to the strictly CMOS implementation of system 10 described previously. However, the bipolar transistors 56 and 58 in current mirror 54 will exhibit superior transfer characteristics as compared to the current mirror 24 discussed with reference to FIG. 1. As such, if an integrated system already uses bipolar technology, the current mirror 54 could be implemented without substantial increased cost. System 50 operates identically to system 10 described previously with respect to the operation of transmitter circuit 12 including boost circuit 18. The only change in the operation of system 50 is associated with the different operation and transfer characteristic of the current mirror 54.

Accordingly, a transmission system is provided that allows for the transmission of digital signals across an integrated circuit over long distances and through large intermediate transmission line capacitances. The system utilizes the current mode of signal transmission. Further, a boost circuit 18 is provided that provides additional pathways for charging current and for discharge or charge from the transmission line to reduce the propagation delays associated with the transmission line during operation. The boost circuit 18 does not affect the operation of the steady state transmission of signals by the transmission system of the present invention.

Although the present invention has been described in detail, it should be understood that various changes, alterations, substitutions and modifications may be made to the implementations described herein without departing from the spirit and scope of the present invention which is solely defined by the appended claims.

What is claimed is:

1. A method of communicating a signal comprising the steps of:

generating a steady state current in a transmitter circuit;

receiving an input signal in the transmitter circuit;

generating an active current in the transmitter circuit in response to a first voltage level of the input signal;

generating a boost current in response to transitions in said input signal to enhance charging and discharging of a transmission line, said boost current comprising a current spike of a duration determined by a delay element;

transmitting a current-mode signal through said transmission line, wherein said current-mode signal comprises said steady state current in response to a second voltage level of the input signal and comprises said active current in addition to said steady state current in response to the first voltage level;

receiving said current-mode signal from the transmission line in a receiver circuit coupled to the transmission line; and generating an output voltage in the receiver circuit responsive to the amount of current transmitted to the transmission line from the transmission circuit.

2. The method of claim 1 wherein said step of generating a boost current comprises providing additional current to the transmission line for a predetermined period of time following a first type of transition in the input signal.

3. The method of claim 1 wherein said step of generating a boost current comprises providing an additional discharge path from the transmission line for a predetermined period of time following a second type of transition in the input signal.

4. The method of claim 1 wherein said step of generating a boost current comprises providing additional current to the transmission line for a predetermined period of time following a first type of transition in the input signal; and providing an additional discharge path from the transmission line for a predetermined period of time following a second type of transition in the input signal.

5. The method of claim 1 and further comprising the step of disconnecting portions of the receiver circuit from the transmission line to disable the transmission of the steady state current during periods of inactivity in the transmission line of a predetermined duration.

* * * * *